Figure 1:
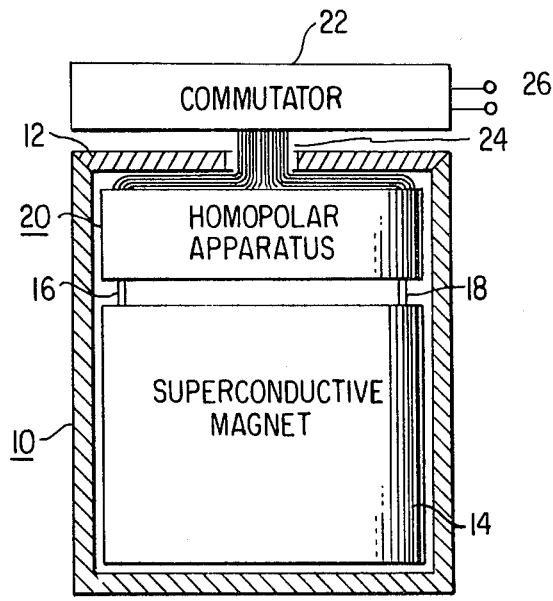

United States Patent

[11] 3,611,113

| [72] | Inventor | William Henry Cherry |
| | | Princeton, N.J. |
| [21] | Appl. No. | 830,944 |
| [22] | Filed | June 6, 1969 |
| [45] | Patented | Oct. 5, 1971 |
| [73] | Assignee | RCA Corporation |
| | | New York, N.Y. |

[54] HOMOPOLAR APPARATUS WHICH REQUIRES NO MOVING PARTS FOR PRODUCING DIRECT CURRENT
10 Claims, 8 Drawing Figs.

[52] U.S. Cl. .................................................. 322/48, 174/68.5, 310/178
[51] Int. Cl. ........................................................ H02p 9/00, H02k 31/00
[50] Field of Search ............................................. 322/48, 44; 310/178; 318/253

[56] References Cited
UNITED STATES PATENTS
3,443,134  5/1969  Dowsett et al. ............... 310/178

Primary Examiner—Oris L. Rader
Assistant Examiner—H. Huberfeld
Attorney—Edward J. Norton ABSTRACT: Apparatus for producing direct current of the homopolar type is provided in which the field moves and both the armature and the field-producing means are stationary whereby no brushes are required. Superconductive material may be used for the armature and for the winding of the field structure, whereby the apparatus is particularly adapted to energize a superconductive magnet.

INVENTOR
William Henry Cherry
BY Edward J Norton
ATTORNEY

INVENTOR
William Henry Cherry
BY Edward J Norton
ATTORNEY

INVENTOR
*William Henry Cherry*

BY *Edward J Norton*
ATTORNEY

HOMOPOLAR APPARATUS WHICH REQUIRES NO MOVING PARTS FOR PRODUCING DIRECT CURRENT

This invention relates to an apparatus of the homopolar type which does not require brushes for producing direct current and which may advantageously be used to energize a superconductive magnet.

Homopolar direct current generators are generators in which a field structure is stationary and a disklike armature is rotated through the magnetic field produced by the field structure. In such a device, the current in the armature is applied to a load by way of brushes or sliding contacts which typically contact the center of the armature and an edge thereof. If an attempt is made to avoid the need of brushes by keeping the armature stationary and rotating the field, there is no practical way to connect the leads that are fixed to the armature to the load without inducing a voltage in the leads which opposes the voltage produced in the armature, whereby a practical direct current homopolar generator which involves a rotating field structure has hitherto been unavailable.

In energizing a superconductive magnet, a source of current at low voltage which provides high current is used. The leads from the source, which carry the high current to the magnet, which is positioned in a cryostat, must be quite heavy and are heated by $I_sR$ losses therein. Furthermore the external portions of the leads are heated by their surroundings whereby the leads carry heat into the cryostat. Both of these heating effects cause loss of refrigeration efficiency. Furthermore, when the current in the magnet has been built up to the rated value of the magnet, to keep the current in the magnet flowing without reduction without continuously supplying current from an external source, a switch having zero resistance when closed must be provided across the terminals of the magnet, and means must be provided to keep the switch open during current buildup and to close the switch when the current has been raised to its rated value.

It is an object of this invention to provide direct current producing apparatus of the homopolar generator type which requires no slipping contacts for the generated current.

It is another object of this invention to provide direct current producing apparatus of the homopolar generator type which is particularly adapted to energize a superconductive magnet and which acts as a zero resistance switch across the terminals of the magnet when the apparatus is not energizing the magnet.

In accordance with this invention, a thin plate of superconductive material with output connections thereto and a magnetic filed structure which is fixed with respect to the plate are provided, the field structure being so positioned that the field produced by the field structure cuts or penetrates the plate. Means including a commutator are provided for so energizing the field structure that the magnetic field moves or appears successively in new positions with respect to the plate whereby a current is induced in the plate and it its output connections. Since the direction of the field is predominantly unchanging, the produced current is unidirectional. If it be desired to use the apparatus to energize a superconductive magnet and to maintain a circulatory current in the winding of the magnet when energized, the plate persistent the output circuit are both constructed of superconductive material, and the terminals of the plate are permanently connected across the terminals of the magnet, the magnet and the apparatus being maintained at a superconducting temperature by a known means. When the field structure is energized as by a low-current source to provide the moving field, the apparatus provides a high direct current at low voltage for energizing the superconducting magnet. When the current in the superconducting magnet has been built up to its rated or desired value, the energization of the filed structure of the generator is caused to cease and the plate becomes a zero resistance connection across the terminals of the magnet to maintain circulatory currents in the magnet, providing a so-called persistent current mode of the magnet. If desired subsequently, energization of the field structure of the generator may be recommended, either in the same or reverse direction as before, and the current in the magnet brought to a new, higher or lower value, respectively, than before, and again placed in the persistent current mode.

Figure 2:
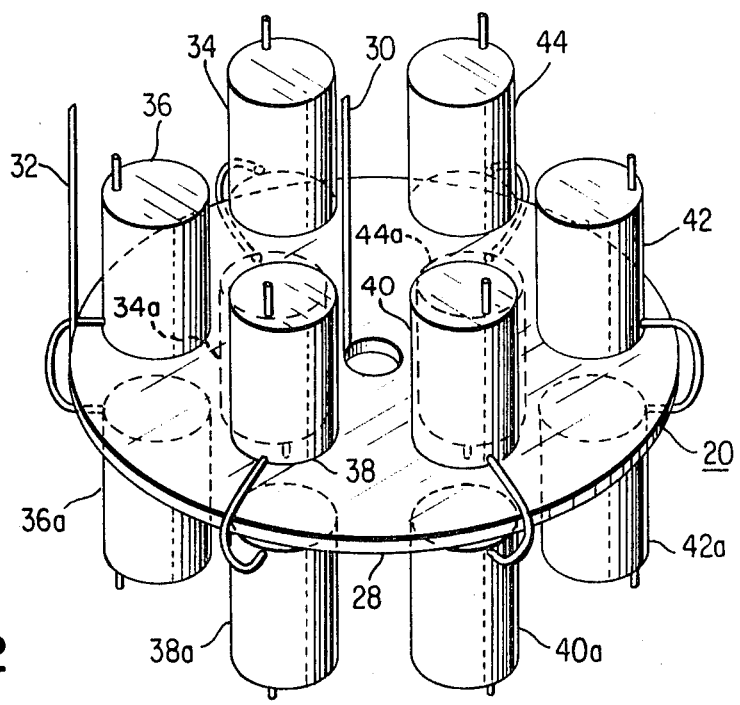
Figure 3:
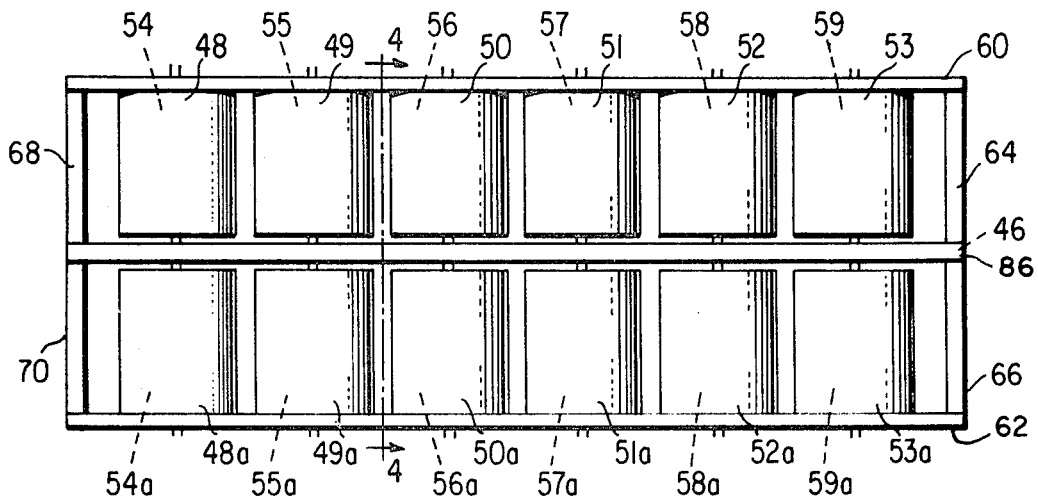
Figure 4:
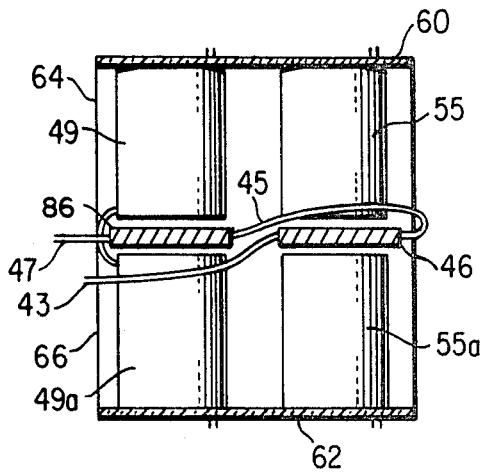
Figure 5:
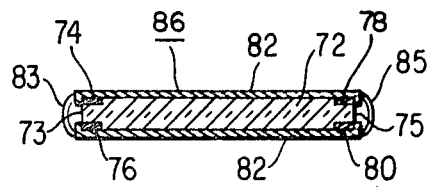
Figure 6:
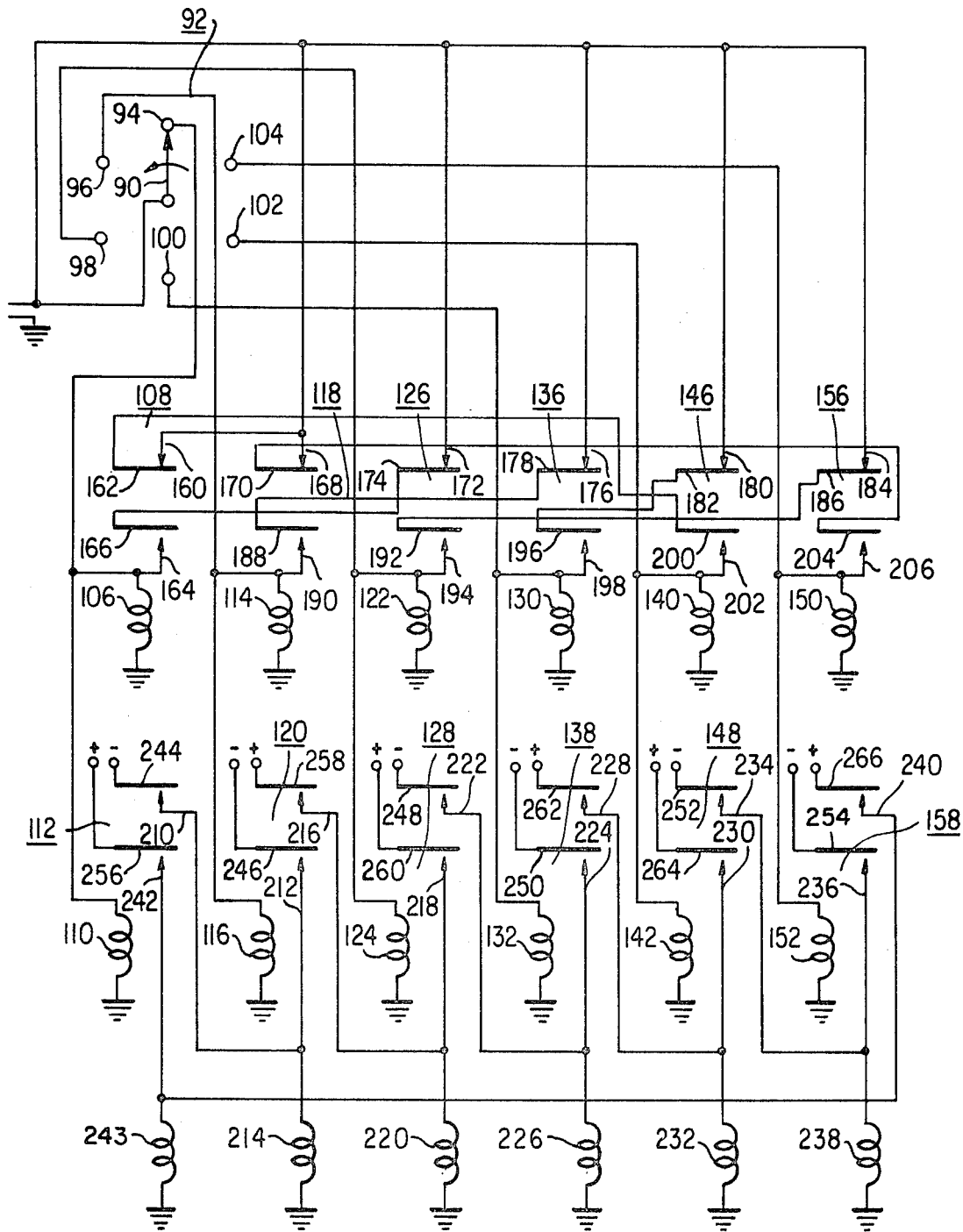
Figure 7:
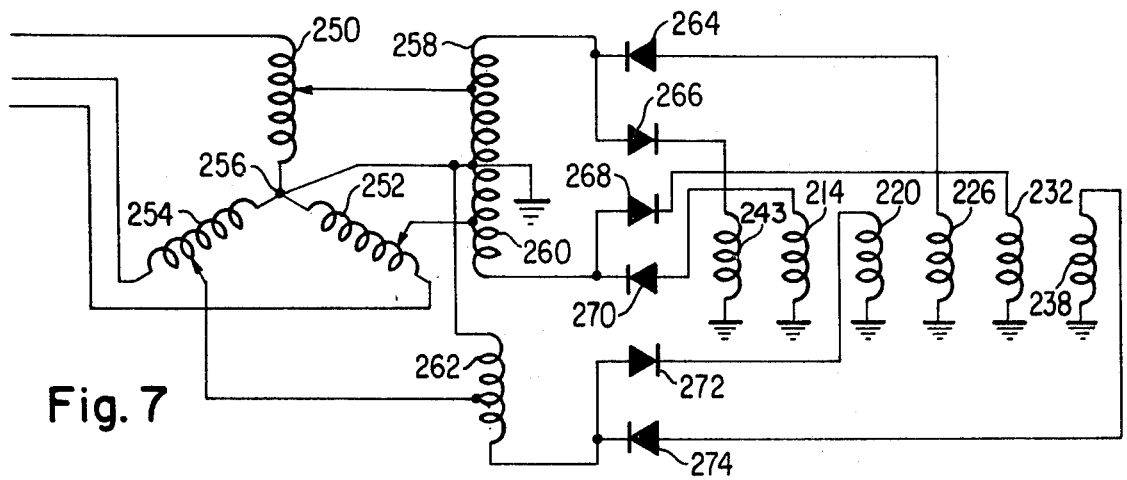
Figure 8:
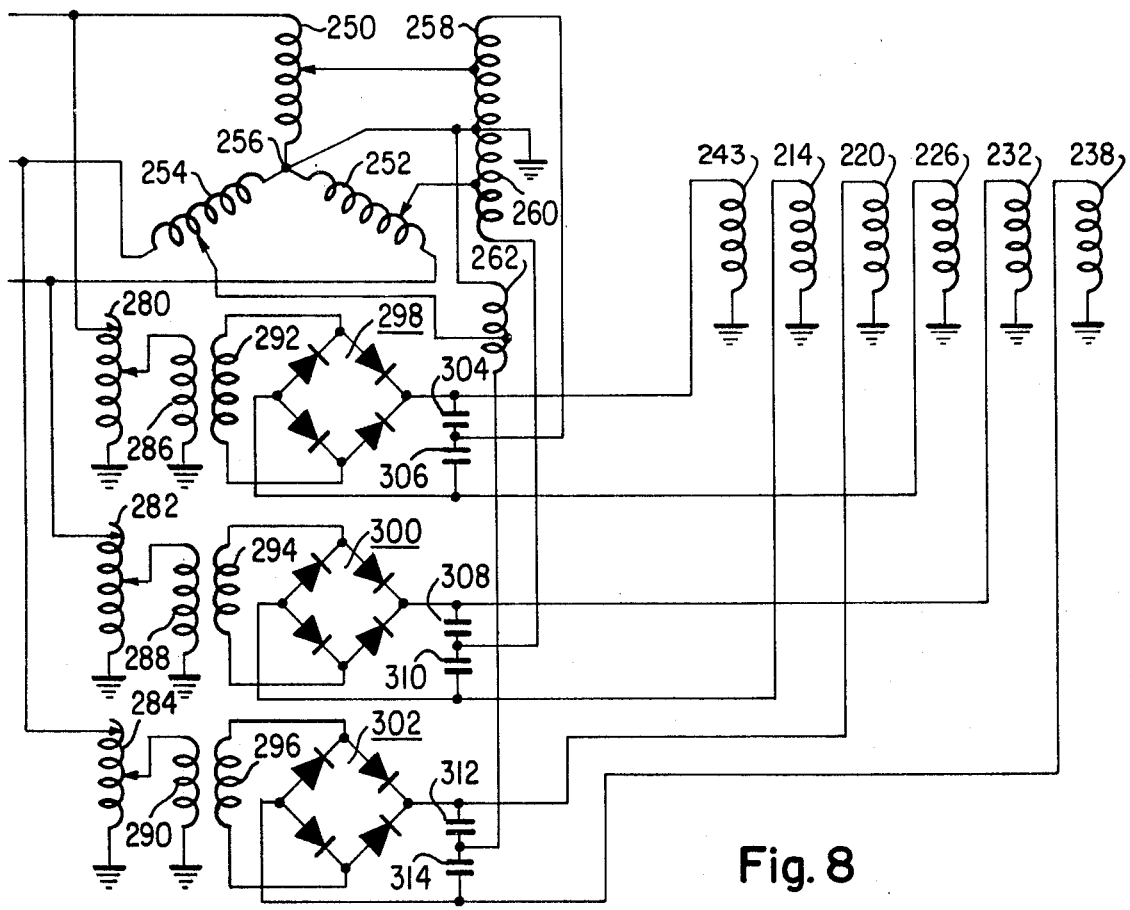

The invention may be better understood upon reading the following description in connection with the accompanying drawings in which:

FIG. 1 illustrates diagrammatically a commutator and a homopolar apparatus of this invention arranged to supply energizing current to, and alternatively to maintain circulating currents in, a superconductive magnet, FIGS. 2 and 3 illustrate embodiments of the homopolar apparatus of FIG. 1, FIG. 4 is a section of line 4—4 of FIG. 3, FIG. 5 is a section of the plate portion of the homopolar apparatus of FIG. 3 at an enlarged scale, and FIGS. 6, 7 and 8 are diagrammatic illustrations of commutators that may be used to energize the field structure of FIGS. 2 and 3.

Turning first to FIG. 1, a cryogenic tank or cryostat 10 having a removable cover 12 is provided. A superconductive magnet 14 of any desired form, having terminals 16 and 18, is positioned in the tank 10. Homopolar converter apparatus 20 is also positioned in the tank 10 while a commutator 22 which is positioned outside the tank 10 is connected to the apparatus 20 by leads 24 which extend through a hole in the cover 12. The output of apparatus 20 is connected to the terminals 16 and 18. Supply leads 26 for the commutator 22 extend to a suitable source (not shown). If desired the commutator 22 may also be positioned in the tank 10.

One form which the homopolar converter apparatus 20 may take is shown in FIG. 2. A plate is provided comprising an annular disk 28 made of material capable of becoming superconducting at the temperature of the cryostat, having an output lead 30 connected to the internal edge of the disk 28 and another output lead 32 connected to the outside edge of the disk 28. The disk 28 may be of composite construction or a stack of disks may be provided as will be explained. As will be explained, a high direct current at low voltage is produced by the converter of FIG. 2 and appears in the leads 30 and 32. The lead 30 is positive or negative with respect to the lead 32 depending on the direction of the magnetic field produced by the field coils 34—44 and 34a—44a and the direction of rotation of the rotating field produced thereby, as will be described. The leads 30 and 32 may be connected respectively to the leads 16 and 18 of FIG. 1 if the apparatus of FIG. 2 is used to energize the superconductive magnet 14 of FIG. 1.

The field structure comprises an array of exciter field coils, here shown as twelve in number which are positioned around the circumference of the disk 28 and within the area or boundaries of the disk 28, the axes of the field coils being perpendicular to the disk. If the converter is to be positioned in a cryostat, it is desirable that these field coils be wound of superconducting wire material to minimize energy loss and heating of the cryostat. Field coils 34, 36, 38, 40, 42 and 44 are shown above the disk 28 as viewed in FIG. 2 and filed coils 36a, 38a, 40a, and 42a are shown below the disk 28, the coils 36 and 36a being coaxial and being connected in series in a field-aiding manner. The coils 38 and 38a are also so positioned and so connected, as are the coils 40 and 40a as well as the coils 42 and 42a. Coils 34a and 44a are in line with coils 34 and 44 respectively and on the underside of the disk 28 therefrom and are connected in series-aiding manner with the coils 34 and 44. Coils 34a and 44a are shown in FIG. 2 by dashed lines for the purpose of clarity of illustration.

For simplicity of illustration, in FIG. 2 the exciter field coils 34—44 and 34a—44a are drawn with circular cross section. The coils neighboring each other along the perimetrical direction around the disk may be shaped and positioned to be as osculatory as possible so that their respective magnetic fields are essentially continuous lateral extensions of each other. Therefore the cross-sectional shape of the coils may resemble a truncated sector of a circle with rounded corners. When energizing current is supplied through the coils in such a manner, as will be explained in connection with FIGS. 6, 7 and 8, as to provide a field which does not vary in direction with respect to the disk 28, but which moves along the disk as from the portion of the disk 28 between the coils 34, 34a to the portion thereof between the coils 36, 36a and then to the portion of the disk between the coils 38, 38a and so on continually, in effect continuously around the disk 28, a voltage is induced in the disk, thereby providing direct current voltage between the terminal 30 and 32. The several coils in FIG. 2 are held in a fixed position with respect to the disk 28 by any known manner, not shown.

In the embodiment shown in FIGS. 3 and 4, two thin conductive plates 86 and 46 and 24 field coils 48–59 and 48a–59a are provided. In FIG. 3, coils 48–53 are lined up along the length of and on one side of the plate 44 and coils 54–59 are lined up along one side of and along the length of the plate 46. These coils are preferably of rectangular cross section and placed almost touching in order to obtain maximum contiguity of their magnetic fields. The centers of the cross-sectional area of the coils 48a–53a register with the centers of the cross-sectional areas of the coils 48–53 respectively and the coils 54a–59a are similarly positioned with respect to the coils 54–59. Coils 48–57 are held in the described position by being fixed to a support plate 60 and coils 48a–59a are fixed to a support plate 62. End plates 64 and 66 are positioned at the right end, as viewed in FIG. 3 of the homopolar converter structure to position the support plates 60 and 62 with respect to conductive plates 86 and 46, and similar end plates 68 and 70 are provided at the left end of the structure for a similar purpose. It will be noted that the near ends of the several coils clear the plates 44 and 46 by a short distance. Coils having the same numbers, such as 49 and 49a, may be connected in series if desired or in parallel, or in parallel with equalizing impedances. In all cases the magnetic field produced by coils having the same reference numbers should be in the same direction. It is advantageous to so connect coils 48–53 and 48–53a that the field produced by these coils extends in the opposite direction from the fields produced by coils 54–59 and 54a–59a whereby the coils adjacent the plate 44 act as flux return paths for the coils adjacent the plate 46 and vice versa. For series connection of the voltage produced in the plates 86 and 46, the inner edge of the plate 44 is connected to the outer edge of the plate 46 as by a conductor 45. The output terminals of the described apparatus of FIGS. 3 and 4 are the leads 43 and 47 which are connected to the other edges of the plates 86 and 46. If desired, parallel connection of these two plates may be made.

If the described homopolar converter apparatus is to be used at room temperature, the coils of FIGS. 2 and 3 are wound with conductive wire and the plates 28, 86 and 46 are made of a good conductor, or are plated with a good conductor, having magnetoresistive properties. If, however, the homopolar converter is to be used in a cryogenic container, as shown in FIG. 1, the coils may be wound with material that is superconducting at cryogenic temperature, any known superconductive material or combination of superconductive materials or any known composite conductor including a superconductive portion being suitable. The plate 86, as illustrated in FIG. 5, may comprise a substrate 72 of an epoxy solid or another plastic material which is resistant to thermal shocks, having opposite edges 73 and 75 formed to receive one or more conductors or superconductors 74, 76, 78 and 80. The plate 86 has a superconductive foil or film or layer 82 on each of its faces. The film 82 may be connected together or not as desired. If connected, they may be connected in series, voltage aiding, or in parallel, current aiding. As shown, they are connected by leads 83 and 85 which may comprise terminals of the plate 86. The conducting or superconducting leads 74, 76, 78 and 80 may be embedded or partially embedded in the substrate before or as the substrate is hardening from the liquid or plastic state. Besides general ease of construction, a special advantage of this construction is to form very gradual gradation of thickness of the substrate material adjacent the contacts of said films with said conduction providing a very smoothly tapered joining of the substrate surface to the conductor surface without microscopic precipices or discontinuity. This permits the easy deposition of a continuous film, and film overlay, without cuts or cracks, that makes for extremely good contact to the leads. It has been found that such a construction for the plates 86 and 46 of FIG. 4 and a similar construction of disklike plate 28 of FIG. 2 results in a plate that is not harmed by extreme changes in temperatures or by the high fields or by the high currents or by the change in conduction from normal to superconducting that has to be undergone by the plates 28, 86 and 46. The leads 83 and 85 may be respective terminals of the plate 86 and may be connected to an output connection such as 43 and 47 of FIG. 4. Similarly, if desired the superconductors 74 and 78 may be terminals for one film 82 and the superconductors 76 and 80 may be terminals for the other film 82, in which case the leads 83 and 85 may be omitted.

Similarly, terminals may be provided for the disk 28 and for the plate 46. Furthermore, several plates or disks such as 28 or 86 and 46 may be stacked and the stack may be positioned between field coils like the plates 86 and 46 and the stacked plates or the films which they comprise may be connected in series or in parallel or in series parallel. As for the disk 28 of FIG. 2, superconductive leads, not shown, which are embedded in the outside periphery of the disk 28 may be connected to the lead 32 and the superconductors, not shown, which are embedded in the inner annular periphery of the disk 28 may be connected to the lead 30. The complete surface of the disk 28 except the outside and inside edges if desired, may comprise a field or layer of superconductive material which is electrically connected to or in contact with the embedded superconductive leads, not shown. A plurality of disks 28 may be stacked coaxially instead of using one disk, as suggested with respect to FIG. 3. Furthermore, three or more aligned field coils all energized in the same directions may be substituted for each of the two field coils having the same reference number in FIGS. 2, 3 and 4 and a plate or plates or a disk or disks may be inserted in the gaps between the two adjacent field coils, if desired.

As shown in FIG. 2, the coils 34, 36, 38, 40, 42 and 44 are connected in series respectively with coils 34a, 36a, 38a, 40a, 42a, and 44a. The field produced by each of the field coils in FIG. 2 is in the same direction, that is, upward for example through the disk 28. The terminal of the coils 34–44 and 34a–44a are connected to a commutator 22 as will be explained.

In FIG. 3, the fields produced by the coils 48–53 and 48a–53a are in the same direction but are opposite in direction to the fields produced by the coils 54–59 and 54a–59a. Such poling of the coils 49 and 55 for example reduces leakage flux since there is a path for the flux up through the coils 49a and 49 and down through the coils 55 and 55a.

While the plates 86 and 46 are connected in series in FIG. 4 they may, if desired, be connected in parallel.

For the described homopolar converter apparatus to operate, the field must penetrate the disk 28 and move around in the area of the disk of FIG. 2, while in FIGS. 3 and 4, the flux must penetrate a plate or plates 86 and 46 and move long the plates from one end to the other end thereof. The flux then jumps back to the one end and continues so to move. The field through each disk 86, 46 must be predominantly in one direction. A means for producing this effect is shown in each of FIGS. 6–8. FIG. 6 will be described first. A source of potential which may be single-phase AC or DC (not shown) may be connected to the rotary arm 90 of the rotary switch 92 having six switch points 94, 96, 98, 100, 102 and 104. The rotary arm 90 may be rotated counterclockwise by a motor not shown. The switch point 94 is connected through the operating coil 106 of a relay 108 to ground and through the operating coil 110 of a relay 112 also to ground. The switch point 96 is connected through the coils 114 and 116 of respective relays 118 and 120 to ground. The switch point 98 is connected through the coils 114 and 124 of respective relays 126 and 128 to ground. The switch point 100 is connected through the coils 130 and 132 of respective relays 136 and 138 to ground. The switch point 102 is connected through the coils 140 and 142 of respective relays 146 and 148 to ground. The switch point 104 is connected through the coils 150 and 152 of respective relays 156 and 158 to ground. The relay 108 has a normally closed pair of contacts 160 and 162 and a normally open pair of contacts 164 and 166. Similarly relays 118, 126, 136, 146, and 156 have normally closed pairs of contacts 168 and 170, 172 and 174, 176 and 178, 180 and 182, and 184 and 186 respectively, and normally open pairs of contacts 188 and 190, 192 and 194, 196 and 198, 200 and 202, 204 and 206 respectively. The source is connected to each of the stationary contacts 160, 168, 172, 176, 180 and 184. The moving contact 162 is connected to the moving contact 200. The moving contact 170 is connected to the moving contact 204. The moving contact 174 is connected to the moving contact 166. The moving contact 178 is connected to the moving contact 188. The moving contact 182 is connected to the moving contact 196. The moving contact 184 is connected to the moving contact 192. The stationary contacts 164, 190, 194, 198, 202 and 206 are connected respectively to switch points 94, 96, 98, 100, 102 and 104.

Each relay 112, 120, 128, 138, 148 and 158 has two pairs of normally open contacts. A fixed contact 210 of the relay 112 and a fixed contact 212 of the relay 120 are connected through a field coil 214 to ground. The other fixed contact 216 of the relay 120 and a fixed contact 218 of the relay 128 are connected through a field coil 220 to ground. The other fixed contact 222 of the relay 128 and a fixed contact 224 of the relay 138 are connected through the field coils 226 to ground. The other fixed contact 228 of the relay 138 and a fixed contact 230 of the relay 148 are connected through a field coil 232 to ground. The other fixed contact 234 of the relay 148 and the fixed contact 236 of the relay 158 are connected through a field coil 238 to ground. The other fixed contact 240 of the relay 158 and the other fixed contact 242 of the relay 112 are connected to ground through a field coil 243. The movable contacts 244, 246, 248, 250, 252, and 254, which cooperate respectively with the contacts 210, 212, 222, 224, 234, and 236, are each connected to a negative terminal of a source and the remaining movable contacts 256, 258, 260, 262, 264, and 266 are connected to a positive source terminal. If single-phase AC is provided, the positive and negative terminals may be provided by rectifier means having a grounded center tap.

As noted above, coils 240, 214, 220, 226, 232, and 238 are field coils and they may respectively represent pairs of coils 34 and 34a, 36 and 36a, 38 and 38a, 40 and 40a, 42 and 42a, 44 and 44a of FIG. 2. Alternately, each of the coils 240, 214, 220, 226, 232, and 238 may represent a series connection of four coils of FIG. 3. The coil 243 may represent coils 54, 54a, 48a and 48 connected in series in the order named. Similarly, coil 214 may represent coils 55, 55a, 49a and 49, the coil 220 may represent coils 56, 56a, 50a, 50, the coil 226 may represent coils 57, 57a, 51a, 51, the coil 232 may represent coils 58, 58a, 52a, 52 and the coil 238 may represent coils 59, 59a, 53a, 53. Therefore, when the energization of the coils 243, 214, 222, 226, 232, and 238 is described the energization of the field coils of FIGS. 2 and 3 will be understood.

In the position of the switch 92 as shown, contacts 160, 162, of relay 108 are open and contacts 164 and 166 of this relay are closed, while contacts 210 and 244 as well as contacts 242 and 256 of the relay 112 are closed. Contacts 210 and 244 being closed causes the field coil 214 to be energized and since the contacts 242 and 256 are closed, the field coil 243 is energized. Even though different polarity of input is used to energize 243 and 214 they are so wound that they provide fields in the same direction, for example, the north pole of all the field coils represented in FIG. 6 may be at the upper end thereof. Opening of contacts 160 and 162 of relay 108 opens the circuit including the holding contacts 200 and 202 of relay 146. Closing the contacts 164 and 166 closes a holding circuit for the relay 108 by way of normally closed contacts 170 and 174. Therefore, when the moving arm 90 rotates out of contact with the contact point 94, the relay points 164 and 166 will still remain in contact to cause the coil 106 to remain energized. Whereby field coils 243 and 214 stay energized.

When the moving arm 90 arrives at the contact 96, relays 118 and 120 are energized. Field coils 214 and 220 are connected respectively to the negative and the positive terminals of a source (that is, the field coil 214 is now energized effectively either through the contacts 210 and 244 or through the contacts 212 and 246). Energization of relay 118 makes a holding circuit for this relay by way of the now closed contacts 188 and 190 and by way of normally closed contacts 176 and 178, whereby the field coil 214 will be energized even through the rotary arm 90 has left the contact 96. The three field coils 243, 214 and 220 are now energized. The rotary element 90 arrives at the contact 98, energizing relays 126 and 128 and now making a holding circuit for the relay 126. However, opening of relay contacts 172 and 174 breaks the holding circuit for the relay 108 whereby the field coil 243 is deenergized and one of the energization circuits including the contacts 210 and 244 for the field coils 214 is broken. However, the field coil 214 is still energized by way of the contacts 212 and 246. By this time, field coils 214, 220 and 226 are energized but field coil 243 has been deenergized and field coils 232 and 238 are not energized. When the arm 90 arrives at the contact 100, the coil 214 is deenergized and the coils 220 and 226 are still energized and the coil 232 becomes energized by operation of the relays 136 and 138. Similarly, when the arm 90 arrives at the contact 102 coil 220 is deenergized, coils 226 and 232 are still energized and coil 238 becomes energized. When the arm 90 arrives at the contact 104, coil 226 is deenergized and the coils 232 and 238 remain energized and coil 243 again becomes energized. This cycle continues as long as the arm 90 rotates in the means described above. Therefore, the energization of the field coils 243, 214, 220, 226, 232 and 238 is always such that if these six coils were arranged in a circle, for example like the coils of FIG. 2, there adjacent coils would always be energized. However, one outside coil of the three would become deenergized while the unenergized coil nearest to the two remaining energized coils would become energized, whereby the field would go around in a circle. If the coils 243, 214, 220, 226, 232, and 238 were arranged in a straight line like coils 48-53 of FIG. 2, the field would move on to the plate 86 from the left for example and go off it to the right and would continue this motion. In such a case, the flux produced by the field structure would cut the conductor comprising the plate 86, and preferably generate a resistive region in the superconducting sheet of plate 86 within the region of penetration by the magnetic field, thereby generating a voltage.

If three-phase AC is available, the commutators of FIGS. 7 and 8 may be used to drive coils 243, 214, 220, 226, 232, and 238. In FIG. 7, one terminal of each of three variable autotransformers 250, 252 and 254 are connected together and to a ground point 256 for providing a voltage adjustment. The other terminals of the autotransformers 250 and 252 and 254 are connected to a three-phase source not shown. The ground point 256 is connected to a ground wire. A point on an autotransformer 258 is adjustably tapped onto the autotransformer 250. A point on an autotransformer 260 is adjustably tapped on the autotransformer 252 and a point on an autotransformer 262 is adjustably tapped on the autotransformer 254. One terminal of each of the transformers 258, 260 and 262 are connected together and to the ground point 256. The other terminal of the autotransformer 258 is connected to the cathode of a rectifier 264 and to the anode of a rectifier element 266. The anode of the rectifier 264 is connected to ground through the field coil 226 and the cathode of the rectifier 266 is connected through a field coil 243 to ground. The other end of the autotransformer 260 is connected to the anode of a diode 268 and to the cathode of a diode 270. The cathode of the diode 268 id connected to ground through the field coil 232 and the anode of the diode 270 is connected through the field coil 214 to ground. The other end of the autotransformer 262 is connected to the anode of a rectifier 272 and to the cathode of a rectifier 274. The cathode of the rectifier 272 is connected to ground through the field coil 220 and the anode of the rectifier 274 is connected to ground by way of field coil 238. As is known, in a three-phase system, the current in the three phases lag each other by 120°. Therefore with the connection of FIG. 7 as shown and described, the maximum field travels continuously from coil to adjacent coil, as from coil 243, to 214 to 220 to 226 to 232 to 238 and back to 240 and so on continuously. Therefore, the system of FIG. 7 may be used to energize the field coils of FIGS. 2 and 3.

An alternative three-phase system for energizing the field coils is shown in FIG. 8. In FIGS. 7 and 8, like elements are provided with corresponding reference characters. In FIG. 8, the autotransformers 280, 282 and 284 are connected respectively across portions of the autotransformers 250, 252 and 254. Adjustable taps on the autotransformers 280, 282 and 284 are connected through respective primary windings 286, 288, and 290 to ground. Respective secondary windings 292, 294, and 296 are coupled to primary windings 286, 288 and 290 and are connected across diagonals of respective rectifier bridges 298, 300, and 302. The conjugate diagonals of the bridge 298, are connected across capacitors 304 and 306 in series. The conjugate diagonals of bridge 300 are connected across capacitors 308 and 310 in series. The conjugate diagonals of bridge 302 are connected across capacitors 312 and 314 in series. The ungrounded terminal of the autotransformer 258 is connected to the junction of the capacitor 304 and 306. The ungrounded terminal of the autotransformer 260 is connected to the junction of the capacitor 308 and 310. The ungrounded terminal of the autotransformer 262 is connected to the junction of the capacitor 312 and 314. The junction of the capacitor 304 and the bridge 298 is connected to ground by way of the field coil 243. The junction of capacitor 306 and the bridge 298 is connected to ground by way of field coil 226. The junction of the capacitor 308 and the bridge 300 is connected to ground through the field coil 232. The junction of the capacitor 310 and the bridge 300 is connected to ground through the field coil 214. The junction of the capacitor 312 and the bridge 302 is connected to ground through the field coil 220. The junction of the capacitor 314 and the bridge 302 is connected through ground through the field coil 238. Therefore, each field coil 243, 214, 220, 226, 232 and 238 has an alternating current and a direct current passing therethrough which results in the peak of a substantially unidirectional wave of sine wave contour passing from one coil to another in sequence. If the direct current component in any coil is greater than one-half of the peak-to-peak alternating current component, the net current will never come to zero. If the direct current component is less than one-half of the peak-to-peak alternating current component, the average field produced by the field coil will still be in one direction, however, the momentary reversed fields may detract from the efficiency of the systems. Due to the combination of the direct and three-phase alternating current energization of the field coils, the maximum field will travel from field coil 240 to coil 214 to 220 to 226 to 232 to 238 to 240 and so on continuously.

The amplitudes of direct and three-phase alternating current components may in this apparatus be adjusted independently to give optimum generator output. It has been found experimentally that exact equality of one-half the peak-to-peak AC component to the DC component is not always best.

When the field coils and the plates 28, 86 and 46 comprises cryogenic material, the maximum field must be great enough to form areas of normal material which travel with the maximum magnetic field, the normal areas being surrounded by superconducting areas. If the commutators of FIGS. 6, 7 and 8 or any part thereof are to be positioned in a cryostat, the conductive portions thereof as near as practical may include superconducting material.

When a superconductive magnet 14 is fully energized by the above-described cryogenic homopolar apparatus and it is desired to permit the circuiting currents to continue to flow, no change need be made in the circuit. The supply current that produced the fields need only be disconnected and then the plates 28 or 86 or 46 will remain connected across the terminals of the superconducting magnet. Since the plates 28, 86 and 46 have superconducting properties, the terminals 16 and 18 of the magnet 14 are short-circuited together through the plates 28, 86 and 46 whichever thereof is used.

While no iron cores are shown or indicated in any transformer or field coil or relay coil, such iron cores as may be desired may be provided. In addition iron, ferrite or similar materials may be used as cores or yokes or partial cores or yokes for the exciter field coils, with corresponding changes in the converter output characteristics and efficiency.

What is claimed is:

1. Apparatus comprising,
   at least one plate which comprises at least a portion of conductive material whose conductivity is affected by a magnetic field,
   a magnetic field structure which is fixed in position with respect to said plate, said field structure being so arranged adjacent said plate that the field produced by said filed structure is applied to said plate and,
   means to cause the field produced by said field structure to change in such a manner that the location of the maximum field travels with respect to said plate whereby a current having a direct component is induced into the combinations of said plate and a load circuit electrically connected thereto.

2. The invention as described in claim 1 in which said field structure includes a plurality of field coils and means are provided to so energize said field coils that the location of the maximum field travels along said plate.

3. The invention as expressed in claim 1 in which said plate is in the shape of an annular disk and in which said field structure is arranged around said disk and within the area thereof.

4. The invention as expressed in claim 1 in which said plate is of rectangular form and in which said field structure is arranged along said plate and within the area thereof.

5. The invention as expressed in claim 1 in which two plates of rectangular shape are provided and in which said plates are arranged side by side and in which said field structure is arranged along each plate and within the area thereof.

6. The invention as expressed in claim 1 in which two plates of rectangular shape are provided and in which said plates are arranged side by side and a field structure is arranged along each plate and within the area thereof and in which said field structure which is arranged adjacent one of said plates is of one polarity with respect to one plate and in which said field structure which is arranged adjacent the other of said plates is of opposite polarity with respect to said one plate.

7. The invention as expressed in claim 1 in which said field structure comprises coils wound with superconductors and in which said plate is at least partially of superconductive material.

8. The invention as expressed in claim 1 in which said field structure comprises coils wound with superconductive conductors and in which said plate is of at least partially superconductive material and furthermore in which said plate comprises a substrate of plastic material coated on at least one side with a layer of superconductive material.

9. The invention as expressed in claim 1 in which said field structure comprises coils wound with superconductive conductors and in which said plate is at least partially of superconductive material, in which said plate comprises a substrate of plastic material coated on separate sides with superconductive materials, a superconductor being embedded in each of opposite edges of said plate and electrically connected to said coating material.

10. The invention as expressed in claim 1 in which said field structure comprises coils wound with superconductive conductors and in which said plate is at least partially of superconductive material and in which points on said plate are connected to terminals of a magnet wound with superconductive conductors.

UNITED STATES PATENT OFFICE
CERTIFICATE OF CORRECTION

Patent No. 3,611,113      Dated October 5, 1971

Inventor(s) William Henry Cherry

It is certified that error appears in the above-identified patent and that said Letters Patent are hereby corrected as shown below:

Col. 1, line 24, correct "$I_2R$" to read -- $I^2R$ --; col. 1, line 30, after "reduction" and before "without" insert -- and --; col. 1, line 47, correct "filed" to read -- field --; col. 1, line 58, after "plate" delete "persistent" and insert -- and --; col. 1, line 69, correct "filed" to read -- field --; col. 1, lines 73 and 74, correct "recommended" to read -- recommenced --.

Col. 2, line 55, correct "filed" to read -- field --.

Col. 3, line 15, correct "44" to read -- 86 --; col. 3, line 31, correct "44" to read --86 --; col. 3, line 37, correct "48" to read -- 48a --; col. 3, line 39, correct "44" to read -- 86 --.

Col. 4, line 31, correct "field" to read -- film --.

Col. 5, line 2, correct "114" to read -- 122 --; col. 5, line 49, correct "240" to read -- 243 --; col. 5, line 52, correct "240" to read -- 243 --.

Col. 6, line 16, correct "through" to read -- though --; col. 6, line 40, correct "there" to read -- three --.

Col. 7, line 1, correct "id" to read -- is --; col. 7, line 59, correct "240" to read -- 243 --.

Col. 8, line 23, correct "filed" to read -- field --.

Signed and sealed this 9th day of May 1972.

(SEAL)
Attest:

EDWARD M. FLETCHER, JR.
Attesting Officer

ROBERT GOTTSCHALK
Commissioner of Patents